United States Patent [19]
Nessar

[11] 3,945,901
[45] Mar. 23, 1976

[54] METHOD FOR ELECTROCOATING CONDUCTIVE ARTICLES

[75] Inventor: Joseph D. Nessar, Painesville, Ohio
[73] Assignee: Diamond Shamrock Corporation, Cleveland, Ohio
[22] Filed: Dec. 13, 1974
[21] Appl. No.: 532,392

Related U.S. Application Data
[63] Continuation-in-part of Ser. No. 371,149, June 18, 1973, Pat. No. 3,898,151.

[52] U.S. Cl. .............................................. 204/181
[51] Int. Cl.² ......................................... C25D 13/04
[58] Field of Search ................................... 204/181

[56] References Cited
UNITED STATES PATENTS
1,168,281  1/1916  Buch ................................. 204/202
3,575,832  4/1971  Johnson ............................ 204/181

*Primary Examiner*—Howard S. Williams
*Attorney, Agent, or Firm*—John J. Freer

[57] ABSTRACT

A method is provided for obtaining the deposition of a protective electrocoating film onto the surface of electrically conductive, magnetically-attractable metal articles. With the method, a multitude of various articles, e.g., screws, clips, bolts, nails and the like, which may be in mixture, can be readily and efficiently electrocoated in batch or continuous operation. The method provides for establishing a magnetic field in close proximity to a coating bath, with the field having sufficient magnetic strength to affect the location of coated parts in at least a zone of the coating bath. The magnetic field cooperates with an assembly that is rotatable, e.g., a drum member. The means for rotation has a face element at least partly immersed in the bath. In rotation, articles are moved within the bath while they are under the influence of the magnetic field.

9 Claims, 7 Drawing Figures

METHOD FOR ELECTROCOATING CONDUCTIVE ARTICLES

CROSS-REFERENCE TO RELATED APPLICATION

This application is a continuation-in-part of U.S. application Ser. No. 371,149, filed June 18, 1973, now U.S. Pat. No. 3,898,151.

BACKGROUND OF THE INVENTION

The deposition of an organic coating by electrical deposition processes on electrically conductive articles has received much attention in recent years. Some of this attention has been focused upon the coating of large numbers of small objects. One attractive feature of such a coating system, which may be termed electropainting, electrocoating or the like, is the generally desirable uniformity of coating.

Such coating uniformity is often difficult to achieve on small objects, as for example, screws, since they have sharp edges and abrupt changes in surface configuration that do not lend themselves to achieving a uniform surface coating. In the coating of such small objects by electrodeposition there has been tried the conventional coating procedure of placing many such items in a wire basket or similar conductive container. It was early appreciated that such method involves coating of the container during coating of the small items contained therein. This results in disposing of the container after merely one use or of the economically unattractive removal of the coating from the container before re-use.

It was therefore suggested to provide electrical connection between the objects to be coated and the container with a disposable connector-conductor, e.g., a layer of steel wool on the container bottom. For example, in U.S. Defensive Publication No. T856,035, such concept has been suggested after a discussion of the above noted problems associated with simply using wire baskets as coating containers. The concept of employing steel wool simply supplants one disposable item coated during the electrodeposition operation for another disposable item.

Such disposable items can be minimized; in the coating of small objects, this has been disclosed in U.S. Pat. No. 3,575,832. It has likewise been discussed in such patent the desirability of employing electromagnetic support means. And, by such support means, the small objects, and disposable connector-conductors, can be carried through not only the coating but also the curing step, although simultaneous coating of a plurality of objects is not ostensibly a practical feature of such operation.

As has been mentioned hereinabove, the difficulty in obtaining a uniform coating for many small objects is associated with the surface configuration of such objects. These configurations present a non-smooth appearance, but this feature may enhance the small objects making contact through deposited, wet coatings to an underlying electrode. Regardless, although paint films that are deposited by the electrocoating process are "self-limiting", at this resulting thickness conductivity of the deposit is retained as long as the coating is wet. Thus, parts deposited on the coating will have impressed upon them sufficient flow of electrical energy to themselves become coated. The "self-limiting" feature provides that the underlying article no longer is sufficiently conductive to achieve a further deposition of paint on itself once a sufficient paint film thickness has been achieved.

Although both anodically depositable and cathodically depositable paints can be formulated, and are contemplated for use herein, commercial development has focused upon anodically depositable paints and such are often used herein for illustration although both types are contemplated.

Movement of small articles during the coating operation is encouraged to achieve efficient coating; but since foaming of such baths may become a problem, suppression of foam generation must be kept in mind. For example, in U.S. Pat. No. 3,616,392 there is disclosed an electrocoating process employing a series of two conveyors, each conveyor being in association with a plurality of hoppers. Loading of parts into hoppers of the first conveyor, and subsequently dumping from same into the hoppers of the second conveyor, ostensibly permits adequate movement of the parts to obtain desirable coating thereon. The angle of the second conveyor then permits the coated parts to be conveyed out of the coating bath for subsequent curing. Such operation is not however simplistic in nature, involving many moving parts, and necessitates a large tank and a considerable bulk of apparatus, when considered in association with the size of the objects to be coated. In regard to this, and other aspects of the foregoing discussion, reference can be had to "Products Finishing", February, 1973, pages 34–43.

SUMMARY OF THE INVENTION

A method is now provided whereby many small articles can be easily and contemporaneously electropainted in batch or continuous operation. The method is tailored towards simplistic operation and suppressing foam generation; and, it is directed to the treatment of magnetically-attractable as well as electrically conductive articles. With the method of the present invention, such small articles are quickly and efficiently electrocoated and often with minimal equipment and further, while reducing uneconomical liquid dragout losses.

The present invention is thus directed to the method of electrocoating a plurality of discrete, magnetically-attractable and electrically-conductive metallic articles of manufacture with a protective electrocoating film by establishing contact between the articles and a bath of electrocoating composition, with the method including the feeding of electrocoating composition to the bath and to a coating zone therein. The method also includes establishing a magnetic field with magnet means in close proximity to the coating zone and having sufficient field strength to attract coated articles located in at least a portion of the zone, as well as providing a rotatable member proximate to, but spaced apart from, the magnet means and offering in rotation a face element in continuous surface-wettting contact with electrocoating composition in the bath. Further, the method calls for establishing electrically conductive means for providing a flow of electrical energy through the coating zone and through electrically conductive articles located therein, and impressing a flow of electrical energy through the means, while feeding articles into the coating zone, into contact with the impressed flow of electrical energy and into the influence of the magnetic field, whereby such articles are coated and attracted onto the face element of the intervening rotatable member. Thereby rotating such member provides for moving on the face element the wet, coated articles within the bath while these articles are under the influence of the magnetic field.

In another aspect, the invention is directed to the method of preparing a multitude of objects for subsequent electrodeposition of an organic film thereon, as well as to such electrodepsition.

DESCRIPTION OF THE PREFERRED EMBODIMENTS

Figure 1:
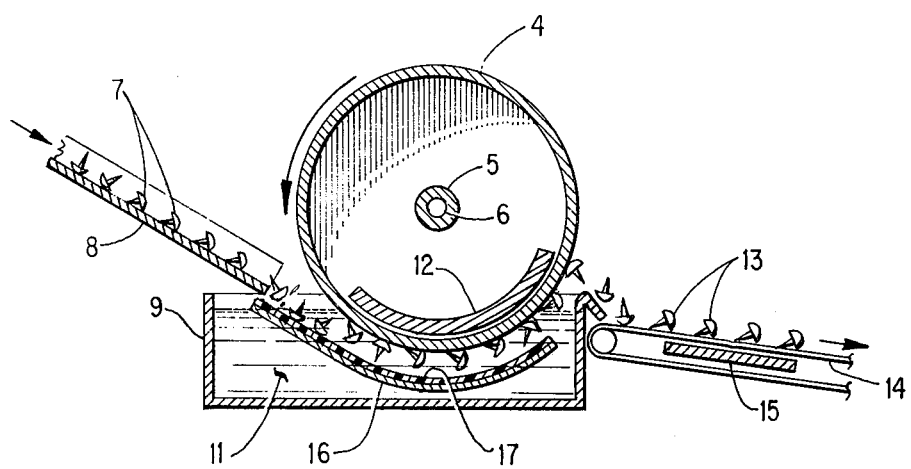
FIG. 1 is a verticle cross sectional view of apparatus according to the invention and having a rotatable drum with interior magnet assembly.

Referring to FIG. 1, a drum or cylindrical shell 4 made conventionally of non-magnetic as well as non-magnetizable but electrically conductive metallic material, is mounted by a hub 5 for rotational movement about a stationary shaft 6. The shaft 6 is usually mounted on bearings, not shown, supported on a fremework, also not shown. Furthermore, the drum 4 is rotated in operation as depicted in FIG. 1 in a counter-clockwise direction typically by connection with a power source, all not shown. Within the drum 4 is a stationary magnet 12 positioned by means of support members not shown. The magnet 12 has an outer, arcuate surface in close proximity to the inner surface of drum 4 and spaced apart therefrom in concentric relationship.

The bottom portion of the drum 4 is slightly immersed in a bath 11 of electrocoat paint contained in a holding tank 9. The tank 9 is located under the end section of a chute 8 down which fresh articles 7 for coating may be conveyed toward the bath 11. On the side of the holding tank 9 opposite the end section of the chute 8, and closely adjacent to the drum 4, is a conveyor 14. On the conveyor 14, coated parts 13 are conveyed away from the drum 4 and over a demagnetizer 15. Near the upper open end of the holding tank 9 and immersed in the bath 11 is an electrode 16 insulating layer on the upper surface thereof.

In operation, small fresh parts 7 are gravity fed from a source not shown down the chute 8; as such articles 7 leave the chute 8 they are attracted to the outer surface of the drum 4 by the magnet 12. In this operation where the bath 11 is an anodically deposited organic material, the drum 4 serves as the anode from a source of electric current, not shown, and is thereby connected to such source by means not shown, e.g., by a brushtype contact. Drum 4 will thereby have deposited on its outer surface a soft, self-limiting layer of electrodeposited paint. As the drum 4 rotates, such wet layer of paint, now shown, will be continuously air exposed and then re-immersed and wetted in the bath 11, maintaining a wet, deposited film.

Continuous rotation of the drum 4 permits parts 7 directed to the outer surface of the drum 4 to move initially through the bath 11 for coating thereon; and, subsequently, while maintained under the influence of the stationary magnet 12, to be conveyed out of the bath 11. This path of travel is continued until gravitational force overcomes the magnetic field. As a result, coated parts 13 fall, typically accompanied by initial slipping across the face of the drum 4, and eventually away from the drum 4 onto the conveyor 14. The coated parts 13 are thereon conveyed away from the drum 4 over the demagnetizer 15 for removing any magnetic effect imparted to the coated parts 13 under the influence of the magnet 12. Such coated parts 13 are transported on the conveyor 14 typically to rinsing and curing means, not shown.

Figure 2:
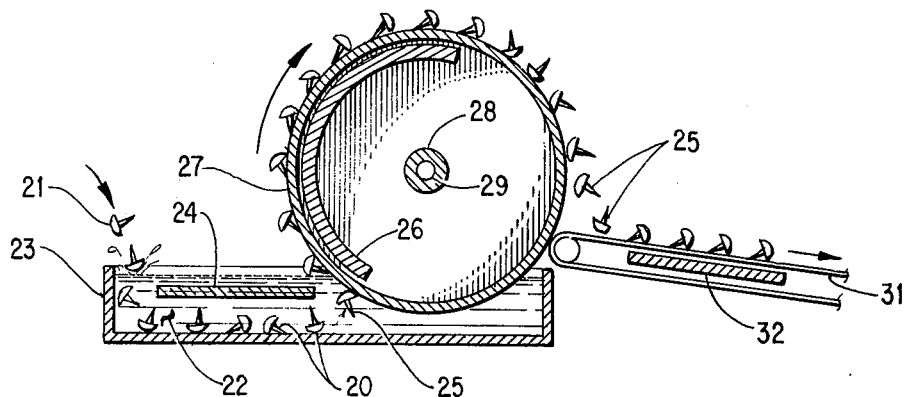
FIG. 2 is a vertical cross sectional view of apparatus employing a tray coating tank as well as a rotatable drum with interior magnet assembly.

In FIG. 2, fresh parts 21 feeding from a source not shown enter a bath 22 of electrocoat paint. The bath 22 is maintained in a tank 23. Submersed parts 20 in the bath 22 may move along the tank 23, e.g., the tank 23 may be a vibrating tray having attendant vibrating means not shown. During such movement, the immersed parts 20 come between the bottom of the tank 23 and an electrode 24 connected to a power source, not shown. The electric charge is given to the immersed parts 20 through the tank 23 and connected in conventional manner to a power source, all not shown.

As movement continues, resulting coated parts 25 come under the influence of a magnetic field originating with a stationary magnet 26 positioned inside a pickup drum 27. The pickup drum 27 rotates in clockwise direction on a hub 28 around a stationary shaft 29. This hub 28 and shaft 29 arrangement has attendant bearings and has attendant means connected with a power source, all not shown. The lower portion of pickup drum 27 is immersed in the bath 22 of electrocoat paint.

The coated parts 25 under the influence of the magnet 26 are attracted onto the pickup drum 27 and by rotation of the drum 27 these parts 25 are carried out of the bath 22. Subsequently, the parts 25 on the drum 27 rotate away from the influence of the magnetic field and fall by gravitational affect to a conveyor 31. On the conveyor 31 the coated parts 25 are then conveyed away and over a demagnetizer 32, typically to rinsing and curing operations not shown.

Figure 3:
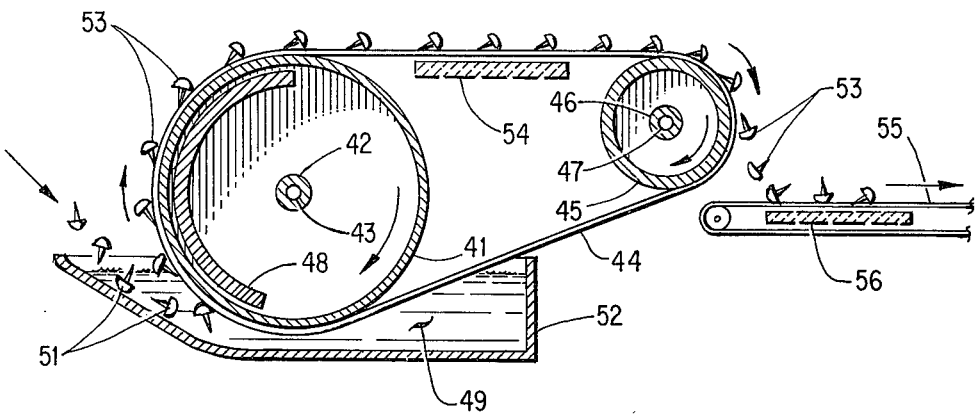
FIG. 3 depicts a two-drum, vertical cross sectional view of apparatus according to the present invention and having a conveyor member around a drum type magnetic assembly.

In FIG. 3 a pickup drum 41 is supported by a hub 42 on a stationary shaft 43. The drum 41 and hub 42 are supported on the shaft 43 by bearings, not shown; and, as with the drum 4 in FIG. 1, the pickup drum 41 is driven by attendant apparatus also not shown. A portion of the outer surface of the pickup drum 41 is in snug contact with a continuous conveyor belt 44 made of electrically conductive but non-magnetic and non-magnetizable material, e.g., stainless steel. The belt 44 is in contact, e.g., by brush contacts, with a source of electric power, conventionally of direct current, all not shown. This conveyor belt 44 is also in snug contact with a conveyor drum 45.

The conveyor drum 45 is supported by a hub 46 on a stationary shaft 47. Attendant support apparatus for the conveyor drum 45 is also not shown. Either the conveyor drum 45 or the pickup drum 41 or both, may be connected through drive means to a power source providing rotational movement. As shown in FIG. 3, both drums 45 and 41 rotate clockwise, thereby, in operation, providing continuous rotation of the conveyor belt 44 in a generally clockwise manner.

The pickup drum 41 houses an interior stationary magnet 48 and further, this drum 41 is in part immersed in a bath 49 of electrocoat paint. The immersion of the drum 41 into the bath 49 also results in the immersion of a portion of the conveyor belt 44 into the bath 49. Also immersed in the bath 49 are freshly entering parts 51 feeding from a source not shown. These parts 51 enter the bath 49 and move along the bottom surface of a holding tank 52 containing the bath 49 of electrocoat paint. The tank 52 is connected by means not shown to serve as the electrode providing an electric charge to the parts 51. Subsequently, coated parts 53 are attracted onto the conveyor belt 44 by the magnet 48. The coated parts traveling on the conveyor belt 44 between the pickup drum 41 and conveyor drum 45 may pass over a demagnetizer 54; continuing on, the coated parts 53 are gravity fed from the conveyor belt 44 and fall onto a removal conveyor 55 for transportation away from the conveyor drum 45 and typically to operations as have been mentioned hereinabove. When no demagnetizer 54 is present between the drums 41 and 45, the coated parts 53 on the removal conveyor 55 pass over a demagnetizer 56. During continued rotation, the portion of the conveyor belt 44 continuing on around the conveyor drum 45 is then reintroduced into the bath 49.

Figure 4:
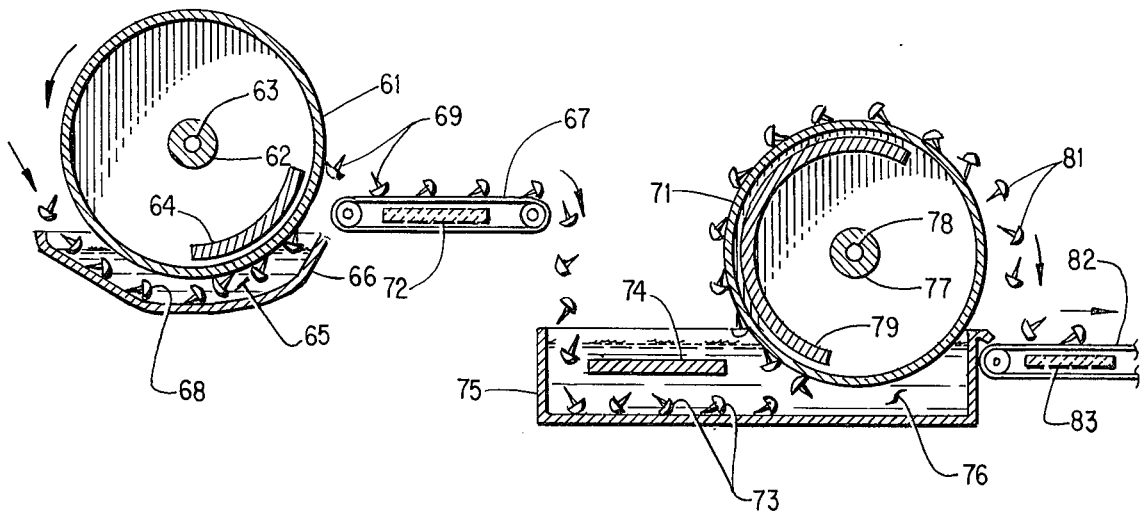
FIG. 4 is a cross sectional view in vertical perspective of an assembly for carrying on surface pre-treatment and subsequent electropainting operation.

Referring to FIG. 4, a first drum 61 is equipped in a manner as has been described for the drum 4 in FIG. 1. Thus, in part, it is mounted on a hub 62 for rotational movement around a stationary shaft 63. Within the first drum 61 is a stationary magnet 64 positioned my means of support members not shown. The magnet 64 is in the lower zone of the first drum 61 and is spaced away from the interior shell surface of the drum 61. The bottom portion of the drum 61 is slighlty immersed in liquid treating composition 65 contained in a holding tray 66. At the left hand portion of the holding tray 66, fresh parts feeding from a source not shown enter the liquid treating composition 65 and become submersed therein under the drum 61.

Closely adjacent to this first drum 61 but at the right hand side of the drum 61 is an intermediate conveyor 67. That is, the conveyor 67 is spaced intermediately between the first drum 61 and a second drum 71. Submersed articles 68 that move out of the liquid treating composition 65 on the rotating first drum 61, reach a zone where gravitational force overcomes the magnetic force of the stationary magnet 64. As a result, the treated articles 69 fall onto the intermediate conveyor 67; thereafter, they may be conveyed over a demagnetizer 72.

The treated articles 69 next are conveyed into a bath 76 of electrocoat paint. The paint bath 76 is contained in a holding tray 75 that serves as one electrode, and hence the bath functions as has been described hereinbefore for FIG. 2. Thus, the other electrode 74 is slightly immersed in the bath 76 and spaced apart from the bottom of the holding tray 75. Submersed and treated parts 73 are coated in the bath 76 as they move under the electrode 74 along the tray 75.

Also immersed in the bath 76 is the lower portion of the second drum 71. As was the case with the first drum 61, the second drum 71 is mounted by a hub 77 about a stationary shaft 78 and has additional, attendant apparatus as discussed hereinabove with similar such drums. Housed in the second drum 71 is a stationary magnet 79. Treated parts 73 that have become coated parts 81 in the bath 76, are conveyed out of the bath 76 under the influence of the stationary magnet 79 on the outer face of the second drum 71. These coated parts 81 fall by gravitational force onto a removal conveyor 82 whereby the coated parts 81 are conveyed over a demagnetizer 83 to subsequent operation.

In operation, as an example, articles that have been surface coated with a phosphate coating and subsequently water rinsed, may then be immersed in an aqueous solution 65 of chromic acid. The subsequently rinsed parts 69 are then brought by the drum 61 out of this solution 65 and deposited on the intermediate conveyor 67; thereon they may be slowly carried under infra red lamps or through an oven or the like for drying. The dried parts then leave the intermediate conveyor 67 and are immersed in a bath 76 of electrocoat paint.

In like manner for a sequence of pre-treatments, a first drum 61 may be used, with attendant apparatus, to prepare the initial phosphate coating on the parts. In this instance, the fresh parts will be introduced into an aqueous phosphate coating bath 65. Resulting phosphate coated parts 69 may then be transported, as on a woven, porous intermediate conveyor 67 that will permit rinsing of the parts on the conveyor 67.

The subsequently coated and rinsed parts can be introduced through a second treating operation, e.g., the above mentioned chromic acid rinse whereby the phosphate coated parts leaving the intermediate conveyor 67 are fed into the chromic acid treating bath 65 and proceed as above described. Where an extended residence time for parts in a liquid composition is desired, such can be achieved, for example, by adjustment of equipment sizing. The advantages of the above sequences, including the extended sequence of first phosphate coating, subsequently chromic acid rinsing, and then painting has been disclosed in U.S. Pat. No. 3,454,483. Similarly, a desirable sequence of coating steps, including a final application of electrocoat paint, which sequence can be handled by apparatus such as depicted in FIG. 4, has been disclosed in U.S. Pat No. 3,616,392.

When many small metallic articles are coated at the same time, adjacent articles may be in close contact that is not easily broken. This phenomena is sometimes referred to as "nesting". Nesting or other inter-part contact can lead to entrapment of air bubbles between parts, resulting in small unpainted patches or "holidays" in the overall painted surface. It is thus desirable to cause some movement between the parts during the coating operation as has been underscored in U.S. Pat. No. 3,728,247. In view of this, and referring to FIG. 5, uncoated parts 91 feeding from a source not shown enter a coating bath 92 on a feed conveyor 93. The coating bath 92 is maintained in a large holding tray 94.

The feed conveyor 93, powered by attendant drive means, not shown, also serves as an electrode; thus, the electric charge given to the uncoated parts 91 is through the feed conveyor 93. It may be connected in a conventional manner, e.g. brush contacts, to a source of electrical energy, all not shown. The feed conveyor 93 may be formed, for example, of non-magnetic and non-magnetizable, but electrically conductive woven stainless steel. The uncoated parts 91 travelling on the feed conveyor 93 pass under an immersed electrode 95, submersed in the coating bath 92 directly above a zone of the path of travel of the feed conveyor 93 and having an upper insulating layer 90. An immersed magnet 89 may be placed under the uncoated parts 91 travelling on the feed conveyor 93 and such parts 91 may come under the influence of the field of this magnet 89 during coating.

Resulting coated parts 96 travelling at first deeper into the coating bath 92 on the feed conveyor 93 come under the influence of a magnetic field emanating from a stationary magnet 97. This stationary magnet 97 is housed in an intermediate drum 98 that is supported by a hub 99 on a stationary shaft 101. This arrangement of drum 98, hub 99 and stationary shaft 101 is supported by bearings and driven by attendant drive means, all not shown. The drum 98 is intermediate between the feed conveyor 93 and a second coating conveyor 102.

Coated parts 96 under the influence of the stationary magnet 97 are attracted and held on the outer surface of the intermediate drum 98. As the drum 98 rotates, these coated parts 96 eventually move beyond the magnetic field; thereafter, while outside the coating bath 92 and under the influence of gravity, they slide down the outer face of the intermediate drum 98. Since the drum 98 during its rotation is partly immersed in the coating bath 92, the outer surface of the drum 98 becomes wet with coating bath liquid. The coated parts 96 therefore slide, in a region of the drum 98 above the second coating conveyor 102, across a wetted surface.

As the coated parts 96 slide free from the wet surface of the drum 98 they re-enter the coating bath 92, which operation acts to enhance separation of adjacent parts and the removal of previously entrapped air bubbles. In falling, the coated parts 96 land on the second coating conveyor 102 powered by attendant drive means, not shown. The second coating conveyor 102 is given an electric charge; thus, through the conveyor 102 the charge is conducted to the coated parts 96, and all by conventional means and through a conventional power source, not shown. On the second coating conveyor 102, the coated parts 96 move under a subsequent immersed electrode 103 having an upper insulating cover 100. This passage under the subsequent electrode 103 serves to continue the coating of the parts 96 after drum-induced separation. The parts 96 may also move over a second immersed magnet 110 that firmly impresses the parts 96 onto the second coating conveyor 102 for enhanced contact during coating. The resulting finally coated parts 104 are then moved along the second coating conveyor 102 and come under the influence of a pick-up drum stationary magnet 105. The pick-up drum 106 housing such magnet 105, is mounted on a hub 107 for rotational movement around a stationary shaft 108 and if further equipped in a manner as has been referred to for the drum 4 in FIG. 1.

As the pick-up drum 106 rotates, the finally coated parts 104 held on the surface of the drum 106 by the stationary magnet 105, move initially out of the coating bath 92. As rotation continues, these parts 104 soon leave the influence of the magnetic field and, under gravitational influence, fall from the drum 106 onto a removal conveyor 109. The parts 104 are then conveyed on the removal conveyor 109 over a demagnetizer 111 and typically on to a subsequent rinse.

As used herein, all of the holding tanks, or holding trays, for the electrocoating liquid are typically connected by recirculating means not shown to separate storage tanks, also not shown. By this arrangement, fresh coating liquid is supplied to the holding tanks generally in amount sufficient for partial immersion of the face element of rotatable members that are in surface-wetting contact with the coating liquid. In the separate storage tank, which may be equipped with attendant cooling equipment, the coating liquid is tyically agitated and filtered and otherwise adjusted, e.g., pH adjustment, to provide for the desired characteristics of the electrocoat paint in the holding tank or tray.

Figure 6:
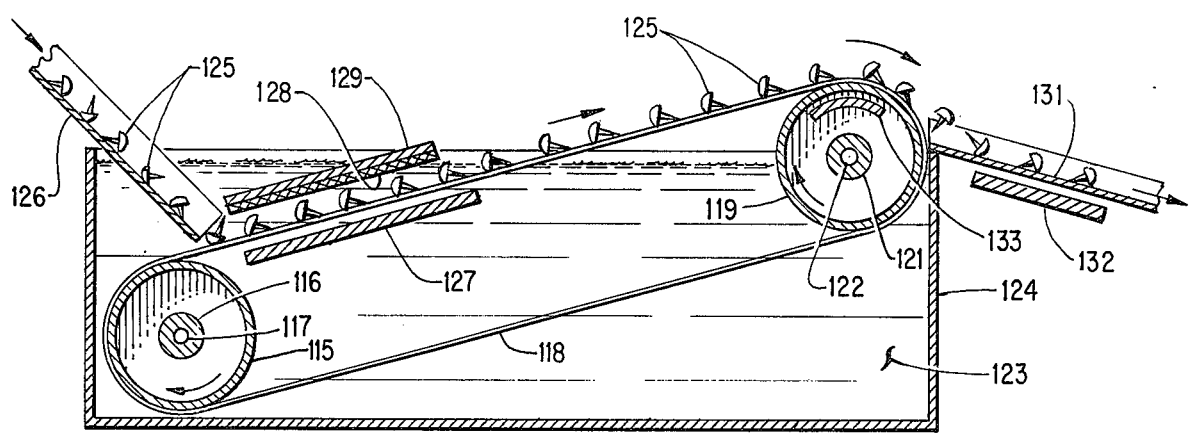
FIG. 6 is a cross sectional view in vertical perspective of a conveyor assembly using a magnet for impressing parts into association with conveyor means.

In FIG. 6 a lower drum 115 is supported by a hub 116 on a stationary shaft 117. The drum 115 and hub 116 are supported on the shaft 117 by bearings, not shown. A portion of the outer surface of the lower drum 115 is in snug contact with a continuous conveyor belt 118 that can be a foraminous belt made of electrically conductive but non-magnetic and non-magnetizable material, e.g., woven stainless steel. The belt 118 is in contact, e.g., by brush contacts, with a source of electric power, conventionally of direct current, all not shown. This conveyor belt 118 is also in snug contact with an upper drum 119.

The upper drum 119 is supported by a hub 121 on a stationary shaft 122. Attendant support apparatus for the upper drum 119 is also not shown. Either the upper drum 119 or the lower drum 115 or both, may be connected through drive means to a power source providing rotational movement. As shown in FIG. 6, both drums 115 and 119 rotate clockwise, thereby, in operation, providing continuous rotation of the conveyor belt 118 in a generally clockwise manner.

The lower drum 115 is immersed in a bath 123 of electrocoat paint maintained in a hold tank 124. The immersion of the drum 115 into the bath 123 also results in the immersion of a portion of the conveyor belt 118 into the bath 123. Also immersed in the bath 123 are freshly entering parts 125 feeding from a source not shown. These parts 125 enter the bath 123 by feeding down a chute 126 on to the conveyor belt 118. As the parts 125 are moved on the belt 118, a magnet 127, partially immersed in the bath 123 and positioned under a portion of the belt 118 on which the parts are traveling, provides a magnetic field that impresses the parts 125 onto the belt 118. Preferably the strength of the magnetic field decreases, by curvature of the magnet 127 away from the belt 118, or by employing an electromagnet, or other similar means, so that the parts 125 are most firmly impressed on the belt 118 as they pass under the electrode 128. This action serves to enhance contact of the parts 125 with the belt 118, which is serving as the electrode providing an electric charge to the parts 125. The magnet 127 may have a series of alternating poles to produce movement of parts 125 on the belt 118, but this movement will not deleteriously interfere with the magnet 127 enhancing contact of the parts 125 with the belt 118. The movement helps break up air entrapment in and among the parts.

The parts 125 traveling on the belt 118 pass under a partially immersed electrode 128 having an upper insulating layer 129. Continuing on, coated parts 125 are gravity fed from the conveyor belt 118 and fall onto a removal deck 131 for transportation away from the upper drum 119 and typically to operations as have been mentioned hereinabove. The coated parts 125 on the removal deck 131 pass over a demagnetizer 132. During continued rotation, the portion of the conveyor belt 118 continuing on around the upper drum 119 is then reintroduced into the bath 123. The upper drum 119 may be equipped with an interior magnet 133 when continued firm attraction of the parts 125 on the belt 118 is desired.

Curing as used herein can include, for example, baking as under infra red lamps or forced and heated air drying, or other useful operation to affect typically polymerization of coating constituents such as radiation curing.

Another procedure for effecting the simultaneous coating of a number of small parts while freeing the parts from deleterious adjacent inter part contact uses an inclined drum. Thus, and referring to FIG. 7, parts 141 ready for coating slide down a feed chute 142, that may be preferably wetted with coating composition as from an overhead spray applicator. As the parts 141 continue down the feed chute 142 they become submersed in a coating bath 143 contained in a holding tank 144. Upon leaving the feed chute 142, the uncoated but submersed parts 141 are deposited into a cylindrical drum 145. This drum 145 has mounting means and is driven in rotation by attendant drive means, all not shown.

The cylindircal drum 145 also serves as an electrode. Hence, electric charge is given to the deposited and uncoated parts 141 through the cylindrical drum 145. It is connected in conventional manner such as through brush contacts to a source of electrical energy, all not shown. The interior of the drum 145 is equipped with a helical track 146. Thus, as the drum 145 revolves, the submersed parts 141 move upwardly in the drum 145, typically in groups of parts, by means of the helical track 146.

As rotation of the drum 145 continues, the parts 141 travel underneath an immersed electrode 147 spaced within the drum 145 but apart therefrom. During conveyance upwardly within the drum 145 and under the immersed electrode 147 the parts 141 thereby become coated. Further, owing to movement within the drum 145, the parts are retained free from deleterious interpart contact.

Resulting coated parts 148 emerge from the drum 145 showing highly desirable uniform coating. These coated parts 148 emerging from the drum 145 are maintained in the coating bath 143. This submergence in the coating bath 143 is maintained by providing for the coated parts 148 leaving the drum 145 to come under the influence of a stationary magnet 149.

The stationary magnet 149 is housed in a cylindrical drum 151 that is supported by a hub 152 on a stationary shaft 153. This arrangement of drum 151, hub 152 and stationary shaft 153 is supported by bearings and driven by attendant drum drive means, all not shown.

Coated parts 148 under the influence of the stationary magnet 149 are attracted and held on the outer surface of the drum 151. As the drum 151 rotates, these coated parts 148 leave the coating bath 143 and continue on the drum until they eventually move beyond the magnetic field. Thereafter, under the influence of gravity, the coated parts 148 slide down the outer surface of the drum 151 and onto a removal conveyor 154. Since the drum 151 during its rotation is partly immersed in the coating bath 143, the outer surface of the drum 151 becomes wet with coating bath liquid. The coated parts 148 therefor slide onto the removal conveyor 154 from a wetted surface of the drum 151. On the removal conveyor 154 the coated parts 148 are carried away from the drum 151 and over a de-magnetizer 155 to further typical operation as hereinabove described.

Referring again to FIG. 1, the chute 8 can be fabricated from stainless steel, as can the holding tank 9, and the fresh articles 7 may be wetted with coating bath liquid, prior to entering into the bath 11, as by spray application of liquid overhead of the chute 8. Such spray application can further be preferably utilized in all such feeds, e.g., overhead of the feed chute 142 of FIG. 7. It is also contemplated that the holding tank 9 in FIG. 1 may serve as an electrode thereby charging the bath 11 and permitting removal of the electrode 16. It is further contemplated that in such arrangement, or in any such assembly described herein of apparatus wherein a tank or tray serves as an electrode, e.g., an anode for anodically deposited paints, that it may be desirable to limit the charged area of the tank. To this end, an insulated coating is applied to predetermined portions of the interior surfaces of the tank, resulting in regions that will not carry an electrical charge to the bath or to articles in the tank. Such insulated coating will thereby serve to reduce the inner surface of the container to a zone more nearly equating to the zone of the cathode area exposed to the coating liquid in the tank. For the insulating layer 17 as depicted in FIG. 1, such can be a perforated nylon screen for protecting the electrode 16.

Figure 5:
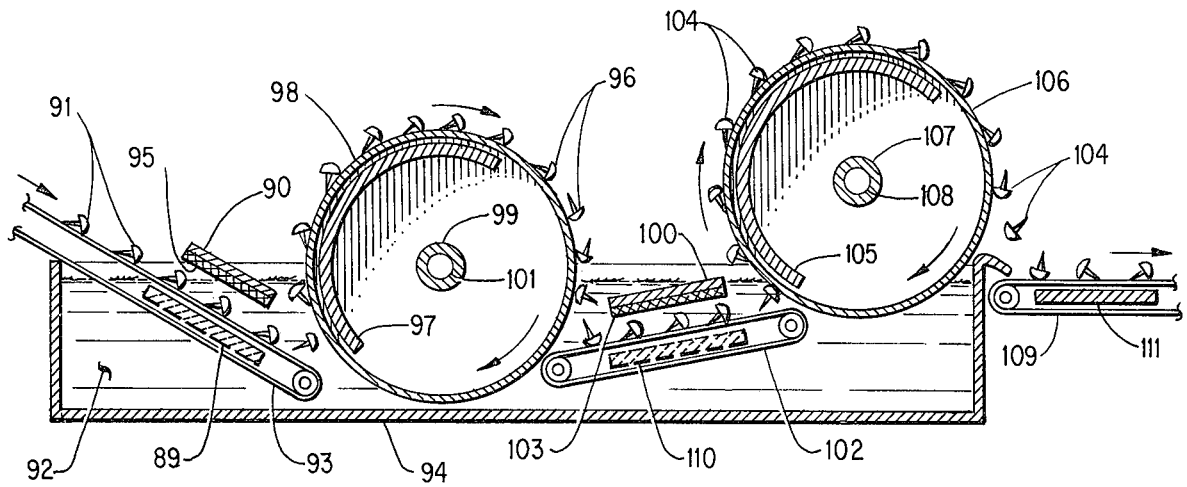
FIG. 5 is a vertical cross sectional view of apparatus wherein a dual rotatable drum assembly enhances small part movement during coating.

In FIG. 2, the fresh parts 21 feeding into the bath 22 may fall onto a coating conveyor, rather than at the bottom of the tank 23, such as the second coating conveyor 102 of FIG. 5. The parts 21 will then be moved along the coating conveyor and coated as they come under the electrode 24. Resulting coated parts 25 leaving the coating conveyor are then attracted by the magnet 26 onto the pick-up drum 27. Such operation is also applicable for the submersed and treated parts 73 in FIG. 4. For either the electrode 24 in FIG. 2 or the electrode 74 of FIG. 4 it is preferred that each have an insulating cover, e.g., a solid plexiglass covering over the electrode, to guard against accidental electrical short circuits as might arise from objects inadvertently falling into the tanks 23 and 75 and contacting such tanks and the electrodes 24 and 74. In FIG. 3, it is contemplated to extend the distance between the pickup drum 41 and the conveyor drum 45, while eliminating the de-magnetizer 54. In this case, the coated parts 53 traveling on the conveyor belt 44 can proceed through one or more rinsing steps, as for example where the conveyor belt 44 is a porous, woven stainless steel belt. Thus the coated parts 53 may even proceed to a curing step prior to removal from the conveyor belt 44 by gravity feeding off the belt 44 around the conveyor drum 45. It is also contemplated in FIG. 3 to feed fresh parts into the bath 49 down a chute. And preferably, to feed fresh parts down a chute, e.g., the feed chute 142 of FIG. 7 wherein fresh bath liquid is applied onto the parts and onto the chute to provide wetted parts feeding into the bath 49.

In FIG. 5, the intermediate drum 98 can be completely immersed in the liquid paint in the coating bath 92. Further, a stationary magnet 97 within the intermediate drum can have field shaping poles, as discussed more particularly hereinbelow, to enhance inter-part movement of the coated parts 96 as they are rotated on the outer surface of the intermediate drum 98. Field shaping poles for stationary magnets are contemplated where parts under the influence of the magnetic field are also in contact with coating liquid. For example, for the stationary magnet 12 in FIG. 1 or the stationary magnet 127 in FIG. 6. Moreover, the feed conveyor 93 in FIG. 5, as well as for all such conveyors depicted in the drawings which carry articles thereon that also are coated thereon, such conveyors can be in assembly with "deplating" electrodes. For the feed conveyor 93 this can be facilitated by positioning an electrode under the conveyor, i.e., adjacent the path of travel of the portion of the conveyor 93 exiting the coating bath 92. This lower electrode is electrically charged with the same charge on the conveyor 93 entering the bath 92. The result is to change the charge on the conveyor 93 in the zone of the lower electrode and thereby remove paint from the conveyor 93 as it leaves the bath 92. Subsequently, the uncoated parts 91 feeding on to the conveyor 93 as it enters the bath 92 are feeding on to a fresh, uncoated surface of the conveyor 93.

Figure 7:
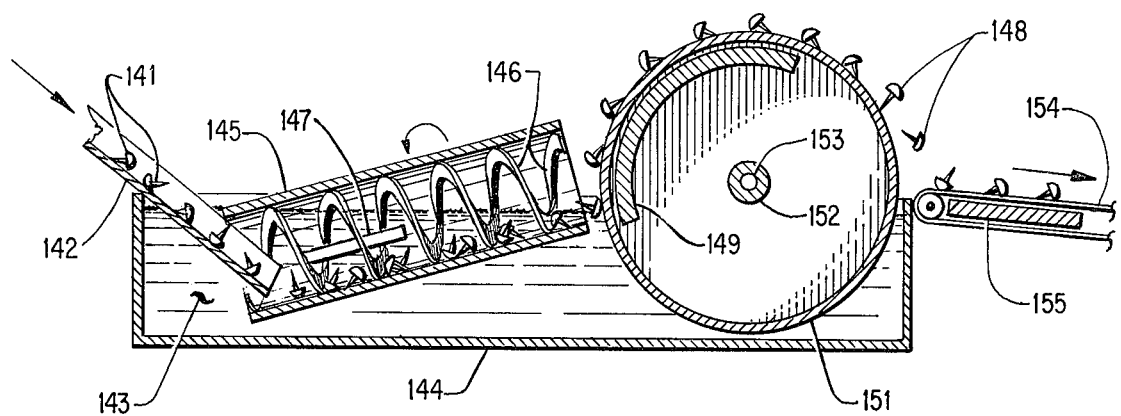
FIG. 7 depicts in a cross sectional view an assembly of a coating drum plus a rotatable magnetic drum.

It is also contemplated in FIG. 5 to provide that the pickup drum 106 be in combination with a conveyor drum such as the conveyor drum 45 in FIG. 3. The conveyor drum would be spaced apart from the conveyor drum 106, with a connecting conveyor belt. Thus, in FIG. 5 as in FIG. 3, the finally coated parts 104 would be moved along a conveyor belt beyond the coating bath 92, then typically proceed through one or more rinsing steps and even a subsequent curing operation prior to removal from the conveyor belt. It may also be desirable in FIG. 5 to replace the feed conveyor 93 and immersed electrode 95 with a cylindrical feed drum having an interior helical track, such as the cylindrical drum 145 having the interior helical track 146 as depicted in FIG. 7. However, for FIG. 5 such drum would be gently canted to permit gradual immersion of the parts 91 entering the coating bath 92. Resulting coated parts 96 could then be deposited on a more fully immersed intermediate drum 98 upon leaving the cylindrical feed drum.

It is further contemplated that such feed drum arrangement will also be useful in FIG. 6 for replacing the feed conveyor 123 plus immersed electrode 125 apparatus. In a like manner, such drum and helical track can be used, in FIG. 6, for replacing the second coating conveyor 132 and subsequent immersed electrode 134. In this replacement however, there is provided an intermediate chute to transmit the re-immersed parts 133 leaving the intermediate drum 128 down into the interior portion of the cylindrical drum. Furthermore, the finally coated parts 135 will be transported out of the coating bath 122 with an additional drum such as with the drum 151 of FIG. 7. Also in FIG. 6 the feed conveyor 123, as well as with other feed conveyors such as the feed conveyor 93 of FIG. 5, may be arranged with overhead spray applicators to wet parts 121 prior to immersion of the parts into the coating bath 122. Such pre-entry wetting with electrocoating liquid serves to enhance performance of the bath as well as to retard holidays caused by entrapped air bubbles.

In carrying out the coating operations, the electrodes that are generally depicted, such as the immersed electrode 125 and subsequent immersed electrode 134 of FIG. 6, are conventionally grid electrodes, sometimes termed "standoff" electrodes that provide an electrical charge to a localized portion of the coating bath, and are typically coarse stainless steel wire mesh.

In FIG. 7, such wire mesh construction can also serve for the immersed electrode 147; but, the electrode 147 is typically arcuate in cross section in conformance with the cylindrical shape of the drum 145. Such electrode 147 is preferably extended essentially to the end zone of the drum 145 wherein the coated parts 148 are leaving the drum 145. It is also preferable that such cylindrical drum 145 be provided with a multitide of minute perforations, insufficient to permit passage of the coated parts 148 therethrough or to substantially impair coating thereof but sufficient to augment free passage of coating liquid within the drum 145.

Coated parts emerging from the coating baths, e.g., the coated parts 13 of FIG. 1 or coated parts 25 of FIG. 2, may typically fall onto one another as they are being processed onto the removal conveyors. This inter-part jostling may result in tiny surface nicks but these tend to be covered in subsequent curing since the deposited coating will flow slightly during the curing process. Where the removal conveyors, e.g., removal conveyor 14 in FIG. 1 or removal conveyor 31 in FIG. 2 will transmit the parts, conventionally after rinsing, to curing operation as to a bake oven, such conveyors may be wire-mesh conveyor belts that are coated with non-stick resin coatings. This enhances freedom from sticking of the coated parts to the conveyor during the curing operation. For this use, resins such as polymerized tetrafluoroethylene, have met with commercial acceptance.

The rotatable drum or cylindrical shell housing an interior stationary magnet can be any of such aparatus that are generally well known in the magnetic separation art. An example of the drum type magnetic separator that can or has been used in the practice of this invention is shown for example in U.S. Pat. No. 2,950,008. In such patent the drum envelops powerful electromagnets which, for the purposes of the present invention, may be powered by alternating or direct current. Additionally, permanent magnets within the drum are particularly serviceable. Furthermore, it is contemplated to use a drum and magnet arrangement such as disclosed in U.S. Pat. No. 3,489,280. The magnets as disclosed therein have field shaping poles whereby material which is magnetically attracted onto the exterior face of the drum can be carried, by rotation of the drum, through a series of alternating polarity magnetic fields. The result is a rotation of the material on the surface of the drum, and the serviceability of this feature has been mentioned hereinabove.

It is further contemplated to supply the outer surface of a drum, as for example the outer surface of the pickup drum 27 of FIG. 2, with an apparatus that facilitates releasing the coated articles away from the face of the drum. As an example, rod or flap members extending longitudinally across the drum face, such members being further spaced apart one from the other, can serve to enhance such release. On the pickup drum 27 in FIG. 2 they will serve to guide away from the surface of the drum 27 the coated parts 25 when these parts 25 begin to slide downwardly on the wet face of the drum 27. The longitudinal rod or flap members also will become wetted by immersion during rotation of the drum 27. Similar guiding action may be obtained by other apparatus, e.g., a rippled screen extending across the circumference of the drum face and longitudinally across such face.

The initial coating apparatus of FIG. 4, including the first drum 61, may be used for applying to the surface of metal articles such treatments as are conventionally used, or any that are contemplated for use, prior to the application of electrocoat paint. Such apparatus will be useful with liquids that would otherwise be applied by immersion or spray application techniques to the metal articles. Thus, the apparatus including the first drum 61, or similar apparatus preceding the apparatus including the first drum 61, may be used for operations including cleaning or rinsing, etching, coating or combinations of such operations. And by the use of the term "treating" herein, such use is intended to include these operations. Moreover, metallic objects or articles that have magnetic susceptibility and are typically dip or spray treated are represented by metal fasteners including nuts, bolts, screws and clips, and such preferably that have a ferrous substrate such as iron or steel including magnetizable stainless steel, but also including galvanized steel, chromeplated steel, and other coated substrates.

Parts for coating, such as the articles 7 in FIG. 1, are typically freshly cleaned parts as may be obtained by degreasing with known agents, for instance, agents containing metasilicate, caustic soda, carbon tetrachloride, trichloroethylene, and the like. Such parts, e.g., grade 8 bolts which are 1 1/16 inches long by ¼ inch in diameter at the threaded end and have ⅞ inch of threading on the shaft topped by a ⅝ inch smooth shaft section that terminates in the bolt head, are coated in conventional manner with a pre-paint primer.

The primer is water-based and contains 300 grams per liter (g/l) of zinc flake and 40 g/l of chromic acid. Further, the composition is prepared with three milliliters per liter (ml./l) of wetter and 21 volume percent of dipropylene glycol. The wetter is a nonionic, modified polyethoxy adduct having a viscosity in centipoises at 25° C of 180 and a density at 25° C of 8.7 pounds per gallon. The cleaned bolts are coated by placing in a wire basket and dipping the basket into the coating composition, removing the basket and draining excess composition herefrom with a mild shaking action and then immediately baking in a hot air convection oven at a substrate temperature of about 450° F for about 10 minutes. The parts are then ready for the application of electrocoat paint. In such operation, the electrocoat paint used is a commercial water-based, black-pigmented polyester-based paint. It is anodically deposited with an impressed voltage of 100–150 volts for a duration of about 45 seconds. For this, and referring to FIG. 1, the pre-coated parts 7 are carefully gravity-fed down a metal tray, e.g., the chute 8. As these parts 7 come down the feed tray 8 and are initially submersed in the bath 11 of the electrocoat paint, the stationary interior magnet 12 of the magnetic drum 4 attracts the falling parts 7 directly on to the outer surface of the magnetic drum 4.

The magnetic drum measures 12 inches in length along the shaft or axis about which the drum rotates. The drum is about 13 inches in diameter and is equipped with rim elements at each end projecting upwardly from the drum face approximately ½ inch and around the entire extent of the circumference of the drum, thereby providing the end of the drum with an about 14-inch diameter. The drum, a model DPC-1212, manufactured by the Bux-Shrader Company, rotates in a counter-clockwise manner. The drum is geared to rotate at a rate of about 0.25 revolution per minute. It serves as the anode in the painting operation by means of brush contacts on each of the drum rims. Across the face of the drum and parallel to the drum shaft axis are six aluminum flaps.

These flaps are placed across the face of the drum at essentially equal distance one from the other and in cross section, have a shape like a lazy h; the flaps are affixed to each rim member by metal bands around the periphery of the rim. The flaps are positioned such that coated parts 13 slipping downwardly on the face of the drum 4 will contact the leaning, longer member of the lazy h portion of the flap and thereby, as slipping continues, will be deflected away from the continuously rotating drum 4. The interior magnet within the drum is a stationary permanent magnet that holds the parts 7 securely on the face of the drum 4 during rotation through the paint 11. During such rotation, the parts 7 become anodically charged by the drum 4 and pass by the cathode 16, thereby receiving the deposition of paint. In operation, the cathode 16 has a perforated nylon screen insulator 17 to guard against electrical short circuits.

Thereafter, as the drum 4 continues rotation, the coated parts 13 are conveyed in an arcuate path of travel out of the paint bath 11. As such parts 13 are overcome by gravitational forces, they slip downwardly across the face of the drum 4 and during this are in contact with the wet paint film on the face and on the flaps of the drum 4 which film has been deposited during the continuous rotation of the drum 4 through the bath 11. Thereafter, these coated parts 13 fall onto the conveyor 14 and are transported then to a rinsing operation. After rinsing, and then baking, which augments flowing of the deposited paint over the contact points of the parts 7 with the drum 4 that have resulted during the coating operation, the subsequent painted articles are dry to the touch and, under visual inspection, have the appearance of articles ready for commercial use, e.g., under corrosive conditions.

I claim:

1. The method of electrocoating a plurality of discrete, magnetically-attractable and electrically-conductive metallic articles of manufacture by establishing contact between said articles and a bath of electrocoating composition, which method comprises:

A. feeding coating composition to said bath and to a coating zone therein;

B. establishing a magnetic field with magnet means in close proximity to said coating zone and having sufficient field strength to attract coated articles located in at least a portion of the zone;

C. providing a rotatable member proximate to, but spaced apart from, said magnet means and offering in rotation a face element in continuous surface-wetting contact with coating composition in the bath;

D. establishing electrically conductive means for providing a flow of electrical energy through the coating zone and through electrically conductive articles located therein, and impressing a flow of electrical energy through said means; while, E. feeding articles into said coating zone, into contact with said impressed flow of electrical energy and into the influence of said magnetic field, whereby said articles are coated and attracted onto the face element of said intervening rotatable member; and F. rotating said member and moving on said face element the wet, coated articles within the bath while said articles are under the influence of said magnetic field.

2. The method of claim 1 wherein coated articles are conveyed on a rotating drum away from said contact zone while attracted by a magnetic field emanating from magnet means within said drum.

3. The method of claim 1 further characterized by conveying coated articles away from said rotating member and to rinsing means, thereby preparing coated and rinsed articles.

4. The method of claim 3 further characterized by demagnetizing coated articles as they are conveyed away from said rotating member.

5. The method of electrodepositing a coating on a plurality of discrete, magnetically-attractable and electrically-conductive metallic articles of manufacture by first pre-treating the surface of the articles for receiving the deposition of said coating and thereafter establishing contact between the pretreated articles and a bath of coating composition, which method comprises;

- A. pretreating said articles in a contact zone of liquid treating composition wherein articles are wetted and surface treated;
- B. establishing a magnetic field with magnet means in close proximity to said contact zone and having sufficient field strength to thereby attract articles located in at least a portion of the contact zone;
- C. providing a rotatable member proximate to, but spaced apart from, said magnet means and offering in rotation a face element in continuous surface-wetting contact with liquid composition in said contact zone;
- D. rotating said member and conveying on said face element and out of said contact zone, treated articles attracted onto the face element under the influence of said magnetic field;
- E. transporting treated articles from the face element to a coating zone of a coating bath;
- F. establishing a magnetic field with magnet means in close proximity to said coating zone and having sufficient field strength to attract coated articles located in at least a portion of the zone;
- G. providing a rotatable member proximate to, but spaced apart from, said magnet means and offering in rotation a face element in continuous surface-wetting contact with coating composition in the bath;
- H. establishing electrically conductive means for providing a flow of electrical energy through the coating zone and through electrically conductive articles located therein, and impressing a flow of electrical energy through said means; while,
- I. feeding treated articles into said coating zone, into contact with said impressed flow of electrical energy and into the influence of said magnetic field, whereby said articles are coated and attracted onto the face element of said rotatable member; and
- J. rotating said member and moving on said face element the pretreated and coated articles within the bath while said articles are under the influence of said magnetic field.

6. The method of claim 5 wherein coated articles are conveyed on a rotating drum away from said contact zone while attracted by a magnetic field emanating from magnet means within said drum.

7. The method of claim 5 further characterized by conveying coated articles away from said rotating member and to rinsing means, thereby preparing pretreated, coated and rinsed articles.

8. The method of claim 5 further characterized by demagnetizing articles as they are conveyed away from a rotating member.

9. The method of claim 5 further characterized by drying transported, treated articles and preparing dry, surface-treated articles for coating.

* * * * *